Patented Nov. 18, 1947

2,430,988

UNITED STATES PATENT OFFICE 2,430,988

STEROID COMPOUNDS AND METHOD OF PREPARING THE SAME

Russell Earl Marker, Mexico City, Mexico, and Eugene Leroy Wittle, Detroit, Mich., assignors to Parke, Davis & Company, Detroit, Mich., a corporation of Michigan No Drawing. Original application October 25, 1940, Serial No. 362,836. Divided and this application May 24, 1944, Serial No. 537,203

13 Claims. (Cl. 260—397.5)

This invention relates to the preparation of steroidal sex hormones from sterols and bile acids.

This application is a division of our copending application, Serial No. 362,836, filed October 25, 1940, and is directed more particularly to the preparation of certain intermediate compounds which are convertible into sex hormones.

One object of this invention is to afford a process whereby compounds simply convertible into sex hormones can be prepared from sterols or bile acids in improved yields.

Another object of this invention is to afford a simplified process for the preparation of compounds simply convertible into sex hormones.

Other objects will become apparent on perusal of this specification and the appended claims.

We have developed a process in which the oxidation proceeds in good yields to give intermediates which can be converted simply and in good yields to the sex hormones.

Our process consists essentially in treating a steroid of the formula,

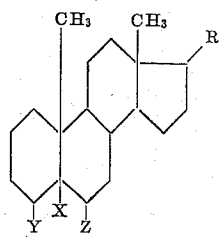

Where R is a member of the group consisting of hydrocarbon radicals and oxygenated hydrocarbon radicals, X is a halogen, and one of Y and Z is a member of the group consisting of hydrogen and halogen, the other being hydrogen, with an agent capable of oxidatively rupturing carbon-to-carbon bonds of the group R, treating the oxidation products having a shortened side-chain thus obtained to obtain the corresponding $\Delta^4$-unsaturated steroids, and treating these with an agent capable of oxidizing a methylene group adjacent to a double bond, thus forming the corresponding 3-keto $\Delta^4$-unsaturated steroids having a shortened side-chain.

In greater detail, our new process consists first in forming a $\Delta^4$- or $\Delta^5$-unsaturated sterol or bile acid derivative. Because of their availability, we prefer to use as starting materials the naturally occurring sterols in which the side-chain R is a hydrocarbon radical containing 8 to 10 carbon atoms. This side chain may be saturated, as in cholesterol $C_8H_{17}$ or sitosterol $C_{10}H_{21}$, or it may be unsaturated as in ergosterol $C_9H_{17}$. Sterols of this type are readily converted into the corresponding 3-desoxy compounds, i. e., into the $\Delta^4$- or $\Delta^5$-unsaturated hydrocarbons. Thus cholesterol may be distilled at atmospheric pressure to give a $\Delta^4$-cholestene, or it may be treated with phosphorous pentachloride or thionyl chloride to form cholesteryl chloride, and the latter reduced, as for example, with sodium and amyl alcohol to yield $\Delta^5$-cholestene.

The $\Delta^4$- or $\Delta^5$-unsaturated steroidal hydrocarbon used as a starting material is first treated with halogen or hydrohalic acid to add the elements of these substances to the steroidal double bond. We prefer to use chlorine, bromine, hydrogen chloride or hydrogen bromide in this step. The compound thus obtained has a halogen atom attached to $C^5$ and another halogen atom or hydrogen atom, depending upon whether halogen or hydrohalic acid was added, is attached to the other carbon atom of the original double bond. Thus when bromine is used to treat a $\Delta^4$-unsaturated steroidal hydrocarbon, the intermediate compound obtained has the following formula,

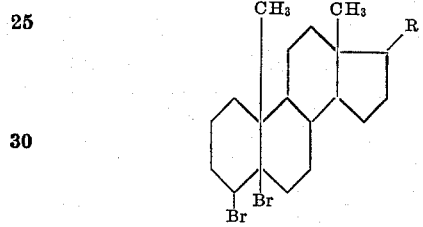

where R is a member of the group consisting of hydrocarbon radicals and oxygenated hydrocarbon radicals.

When a $\Delta^5$-unsaturated steroidal hydrocarbon is treated with bromine, the intermediate compound obtained has the formula,

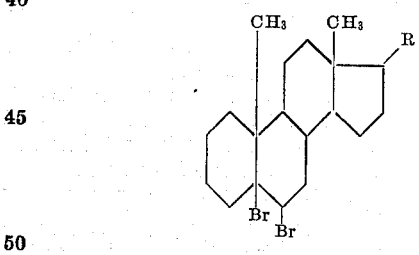

where R is a member of the group consisting of hydrocarbon radicals and oxygenated hydrocarbon radicals.

When hydrochloric acid is used to treat either a $\Delta^4$- or $\Delta^5$-unsaturated steroidal hydrocarbon, the resulting intermediate compound has the following formula,

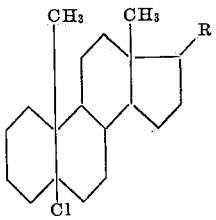

where R is a member of the group consisting of hydrocarbon radicals and oxygenated hydrocarbon radicals.

The dihalide or hydrohalide addition product thus obtained is then oxidized under conditions sufficiently vigorous to rupture carbon-to-carbon bonds. While a variety of agents may be employed for this purpose, we prefer to use chromic acid, permanganic acid or their salts and we find it most convenient to conduct the oxidation in acetic acid below 100° C. and preferably at 35–60° C.

After the oxidation has been completed, the products are separated so as to recover any starting material and then the oxidation product consisting of a mixture of steroids having shortened, oxygenated side-chains is separated into its components according to several possible methods. It is convenient to remove the elements of halogen or hydrohalic acid at this point by treatment with a dehalogenating or dehydrohalogenating agent. Suitable dehalogenating agents include sodium iodide, zinc and acetic acid, metallic magnesium, and the like, and suitable dehydrohalogenating agents are basic substances such as pyridine, sodium acetate and other alkali metal salts of carboxylic acids, and the like.

If a $\Delta^4$-unsaturated steroid has been used as a starting material or if hydrogen halide was the agent added to the unsaturated steroid (either $\Delta^4$ or $\Delta^5$), then the product formed after removal of the elements of halogen or hydrohalic acid, as the case may be, is a $\Delta^4$-unsaturated compound. If, however, the dihalide of a $\Delta^5$-unsaturated steroid was the substance oxidized, after removal of the elements of halogen the product obtained is a $\Delta^5$-unsaturated steroid and it is necessary at some point in the process to convert this into a $\Delta^4$-unsaturated steroid. This is done by adding and then removing the elements of hydrohalic acid.

This shifting of the double bond from $\Delta^5$ to $\Delta^4$ in the oxidation products may be carried out at any stage after the unreacted starting material has been removed from the oxidation products but it must, of course, be done before the steroid is again oxidized to form the 3-keto steroid as set forth later in the specification.

The mixture of oxidation products is conveniently worked up by first separating the acidic and the non-acidic fractions according to methods well known in the arts. The non-acidic fraction thus obtained is further treated to isolate the ketonic fraction and from the ketonic fraction the 17-keto-androstane compound and the 20-keto-pregnane compound are isolated. Then the 17-keto-androstane compound, if it still has the double bond in the $\Delta^5$-position, may be converted into the corresponding $\Delta^4$-androstenone-17. This is done as stated above by adding and then removing the elements of hydrohalic acid. For example, if hydrochloric acid is used, the intermediate compound formed is 5-chloro-androstanone-17 having the following formula

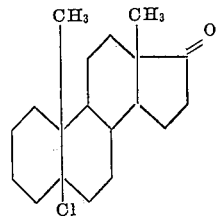

The $\Delta^4$-androstenone-17 thus obtained may be oxidized according to our new method to form $\Delta^4$-androstendione-3,17 and the latter selectively reduced to form $\Delta^4$-androstenol-17-one-3 (testosterone). Otherwise the $\Delta^4$-androstenone-17 may first be selectively reduced under conditions which leave a double bond unaltered so as to form $\Delta^4$-androstenol-17, the hydroxyl group of the latter protected by conversion into a derivative hydrolyzable to regenerate $\Delta^4$-androstenol-17 and this derivative oxidized according to our new method to form the corresponding derivative of $\Delta^4$-androstenol-17-one-3.

In either case the process involves the use of our new method for the preparation of $\Delta^4$-unsaturated 3-keto steroids from $\Delta^4$-unsaturated steroids. This method consists in oxidizing to a ketone group a methylene group adjacent to a double bond and this oxidation is effected by first protecting any hydroxyl groups by converting these into derivatives such as acetates, benzoates, trityl ethers or other groups hydrolyzable to give OH and oxidizing the derivative thus obtained with an agent capable of converting into a ketone group a methylene group adjacent to a double bond. Such agents include chromic acid and permanganic acid and their salts, as well as selenium dioxide. The conditions of reaction depend on the particular oxidizing agent employed, e. g., we prefer to use chromic acid in acetic acid at 30–60° C.

The selective reduction of $\Delta^4$-androstenone-17 may be accomplished with a wide variety of reducing agents. These include catalytic hydrogenation with a Raney nickel catalyst, and the combination of an alkali or alkaline earth metal or aluminum and a substance having reactive hydrogen atoms. Reducing agents of the latter class include such combinations as sodium and ethyl alcohol, aluminum amalgam and aqueous ammonium chloride, calcium and methanol, and the like. Instead of these the reduction may be conducted according to the method of Meerwein and Ponndorff using, for example, ammonium isopropylate and isopropyl alcohol.

It will be appreciated that our invention also comprehends a new group of intermediates for the preparation of sex hormones. This new group of substances is representable by the general formula,

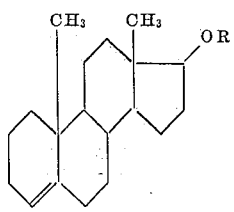

where —OR represents —OH and groups hydrolyzable to —OH. This group of substances includes $\Delta^4$-androstenol-17 and its esters such as its benzoate, acetate, furoate and butyrate.

Our invention also comprehends another new group of intermediate compounds represented by the following formula,

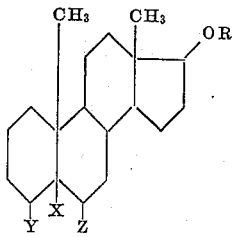

where OR represents —OH and groups hydrolyzable to —OH, X is a halogen and one of Y and Z is a member of the group consisting of hydrogen and halogen, the other being hydrogen. A specific example of such an intermediate compound is 5 chloro androstanol 17.

Our invention may be more fully illustrated by the following example:

*Example 1*

(a) In a 12 liter flask is placed 230 g. of $\Delta^5$-cholestene dibromide prepared, e. g., according to Mauthner, Monatsh., 27, 421 (1906), and 500 cc. of carbon tetrachloride. When solution is complete, 8 liters of glacial acetic acid are added and the solution warmed to 45° C. with stirring. To this stirred solution at 48–50° C. is added dropwise a stirred solution of 320 g. of chromic anhydride in 350 cc. of water and 800 cc. of acetic acid over a period of four or five hours. The solution is stirred at 50° C. for six hours longer and then cooled with cold water or ice to 30° C. Then ethyl alcohol (250 cc.) is added slowly to this stirred solution over a period of about one-half hour to destroy any excess chromic anhydride. The acetic acid is then removed under reduced pressure until the volume of the solution has been reduced about one-half. During the evaporation the temperature of the solution is kept at 40–45° C. The solution is cooled slightly and the unchanged dibromide filtered off and dried. The filtrate is further concentrated under reduced pressure at 40° C. until only a small quantity of acetic acid remains. This residue is diluted with 4 liters of water and 2.5 liters of ether and stirred until all the material is in solution. The water layer is separated and extracted with 2.5 liters of ether. The combined ethereal extracts are washed well with 2 liters of water, 3 liters of water containing 300 cc. of conc. hydrochloric acid, and then twice with 1.5 liters of salt water, sufficient salt being added to cause rapid separation of the layers. The ethereal solution then is evaporated to dryness, the last ether being taken off cautiously to avoid undue heat. The residue contains the dibromides of $\Delta^5$-androstenone-17, $\Delta^5$-pregnenone-20 and $\Delta^5$-cholenic acid.

Instead of using $\Delta^5$-cholestene dibromide in the above step, $\Delta^5$-cholestene dichloride, $\Delta^5$-sitostene dibromide, $\Delta^5$-sitostene dichloride, or other dihalides of $\Delta^5$-unsaturated hydrocarbons derived from sterols may be used instead.

(b) One liter of acetic acid and 5 g. of zinc dust is added to this residue and the solution stirred vigorously and heated to 95° C. on the steam bath. A further 45 g. of zinc dust is added to this stirred solution in small portions over a period of forty-five minutes. Then the solution is filtered from the caked zinc and the latter washed well with acetic acid. The acetic acid filtrate is evaporated to dryness in vacuo on the steam bath and the residue dissolved in 2 liters of ether. The ethereal solution is washed twice with water and the acid fraction is extracted with 5% sodium hydroxide solution until all acids are removed.

(c) The ethereal solution is evaporated to dryness and the residue steam distilled to remove the volatile products. The residue is dissolved in ether and the water layer removed. After evaporating the ether, the residue is dissolved in 200 cc. of 95% ethyl alcohol. Five grams of semicarbazide hydrochloride and 6 g. of sodium acetate are added and the mixture refluxed on the steam bath for four hours, the alcohol being allowed to evaporate to one-half volume. The solution is cooled and diluted with 500 cc. of ether. After shaking the suspension for about one-half hour with cooling, 200 cc. of water is added. The solution is shaken and cooled in a salt-ice bath and then filtered with suction. The white solid is washed well with water and ether. Then it is refluxed with 50 cc. of alcohol for one hour, cooled, filtered, and air dried; yield 5 g. of white powdered semicarbazone, M. P. 285–287° C. This is the semicarbazone of $\Delta^5$-androstenone-17.

(d) A solution of 6.7 g. of $\Delta^5$-androstenone-17 semicarbazone, in 500 cc. of 95% ethyl alcohol, 35 cc. of concentrated sulphuric acid and 35 cc. of water is refluxed for two and one-half hours on the steam bath. The solution is diluted with water and the organic material extracted with ether. The ethereal solution is washed well with water and sodium bicarbonate solution and evaporated to dryness. The residue is purified by distillation at 80° C. in a molecular still and crystallization from dilute alcohol to yield 3 g. of $\Delta^5$-androstenone-17, M. P. 100–105° C. On further purification the M. P. may be raised to 105–107° C.

(e) To a solution of 1.7 g. of $\Delta^5$-androstenone-17 in 26 cc. of refluxing n-propyl alcohol is added 2.5 g. of sodium in small portions over a period of a half hour. Then the solution is poured into water and the white solid collected. This is crystallized from methanol to yield 1.4 g. of $\Delta^5$-androstenol-17, M. P. 163–165° C.

Three grams of $\Delta^5$-androstenol-17 is refluxed for one hour with 30 cc. acetic anhydride and then the solution is evaporated to dryness under reduced pressure. The residue is dissolved in hot methanol and allowed to crystallize. The $\Delta^5$-androstenol-17-acetate thus formed has M. P. 133–135° C. Hydrolysis of this acetate, i. e., with alcoholic potassium hydroxide, regenerates the original hydroxy compound, $\Delta^5$-androstenol-17.

(f) A stream of dry hydrogen chloride is bubbled for several hours through a solution of 1 g. of $\Delta^5$-androstenol-17 in about 20 cc. of chloroform, cooled to 0° C. After the cold solution has stood for several hours, it is carefully evaporated to dryness under reduced pressure on a water bath. The white solid hydrochloride remaining behind is $\Delta^5$-androstenol-17 hydrochloride (5-chloro-androstanol-17) having the following formula

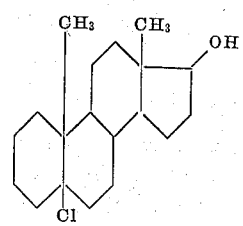

It is dissolved in ethyl alcohol and refluxed for six hours with 4 g. of fused potassium acetate. The resulting solution is poured into water and the precipitate collected and dried. This crude product is acetylated by refluxing it with acetic anhydride for two hours. Fractional crystallization of the acetylated product yields a small amount of the less soluble Δ⁵-androstenol-17 acetate, M. P. 133–135° C., and a larger amount of the more soluble Δ⁴-androstenol-17-acetate, M. P. 97–100° C. A mixture of these two acetates gives a depression in melting point to 72–82° C.

A solution of 500 mg. of Δ⁴-androstenol-17-acetate, M. P. 97–100° C., in 25 cc. of methanol is refluxed for a half hour with a solution of 1 g. of potassium hydroxide in 10 cc. of 50% methanol. The solution is diluted with water and extracted with ether. The ethereal solution is washed with water and evaporated to dryness. The Δ⁴-androstenol-17 is purified by crystallization from methanol, and then has M. P. 146–149° C.

To a solution of 200 mg. of Δ⁴-androstenol-17 in 100 cc. of acetic acid is added 0.73 cc. of 1.05 molar bromine in acetic acid. This forms the intermediate compound 4,5-dibromo-androstanol-17. After a few minutes, a solution of 300 mg. of chromic anhydride in 20 cc. of 90% acetic acid is added with shaking. The solution is allowed to stand at room temperature for one hour, thus forming the intermediate compound 4,5-dibromo-androstanone-17. It is then warmed with five grams of zinc dust on the steam bath. The solution is filtered, poured into water and the product extracted with ether. The ethereal solution is washed well with water and dilute alkali and evaporated to dryness. The residue is distilled in a molecular still under reduced pressure and then crystallized from dilute methanol to give Δ⁴-androstenone-17 of M. P. 78–80° C. This ketone gives a depression in melting point to 60–65° C. when mixed with Δ⁵-androstenone-17.

(g) To a solution of 2 g. of Δ⁴-androstenol-17-acetate in 75 cc. of glacial acetic at 50° C. is added a solution of 2 g. of chromic anhydride in 25 cc. of 90% acetic acid over a period of one hour. The solution is poured into water and extracted with ether. The ethereal solution is washed well with water and dilute sodium carbonate solution and then evaporated to dryness. The resulting oil, which shows a high androgenic activity, is treated in the known manner with Girard's reagent T to separate the ketonic fraction. The crude ketone is hydrolyzed by warming with alcoholic hydrochloric acid and then distilled in a molecular still at 0.01 mm. pressure. Crystallization of the product so obtained from ether-pentane or dilute methanol gives testosterone, M. P. 148–150° C., identical with the natural product.

What we claim as our invention is:

1. Process which comprises dehydrohalogenating a compound having the formula,

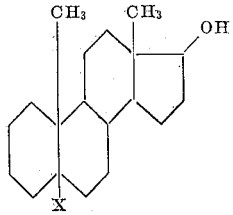

and X is halogen, thereby obtaining

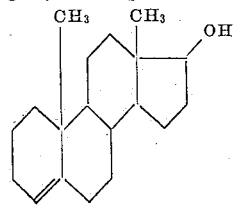

2. Process which comprises treating a compound having the formula,

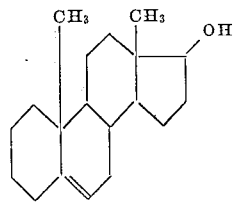

with hydrogen halide thereby forming

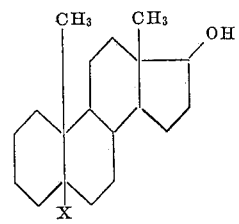

where X is halogen, and dehydrohalogenating said compound to form

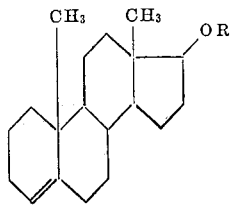

3. Process which comprises treating Δ⁵-androstenol-17 with hydrogen chloride forming 5 chloro androstanol 17, treating said product with fused potassium acetate and then with acetic anhydride thereby obtaining Δ⁴-androstenol-17-acetate.

4. Process which comprises treating a 5-halo androstanol-17 compound with a dehydrohalogenating and an acylating agent thereby obtaining a Δ⁴-androstenol-17 acylate.

5. Process which comprises treating 5-chloro-androstanol-17 with a dehydrohalogenating and an acylating agent thereby obtaining Δ⁴-androstenol-17 acetate.

6. Process which comprises treating Δ⁵-androstenol-17 with hydrogen halide thereby forming 5-halo androstanol-17 and treating the latter with a dehydrohalogenating and an acylating agent thereby forming a Δ⁴-androstenol-17 acylate.

7. Process which comprises treating Δ⁵-androstenol-17 with hydrogen chloride thereby forming 5-chloro-androstanol-17 and treating the latter with a dehydrohalogenating and an acetylating agent thereby obtaining Δ⁴-androstenol-17 acetate.

8. The process which comprises treating Δ⁵-androstenol-17 with hydrogen halide and treating the product resulting therefrom with a dehydrohalogenating and an acylating agent thereby forming a Δ⁴-androstenol-17 acylate.

9. The process which comprises treating Δ⁵-androstenol-17 with hydrogen halide and treating the product resulting therefrom with a dehydrohalogenating agent.

10. The process which comprises treating Δ⁵-androstenol-17 with hydrogen chloride and treating the product resulting therefrom with a dehydrohalogenating agent.

11. The process which comprises treating Δ⁵-androstenol-17 with hydrogen halide, treating the product resulting therefrom with a dehydrohalogenating agent and then with an acylating agent thereby forming a Δ⁴-androstenol-17 acylate.

12. The process which comprises treating Δ⁵-androstenol-17 with hydrogen chloride, treating the product resulting therefrom with a dehydrohalogenating agent and then with acetic anhydride thereby obtaining Δ⁴-androstenol-17 acetate.

13. The process which comprises treating Δ⁵-androstenol-17 with hydrogen chloride, treating the product resulting therefrom with fused potassium acetate and then with acetic anhydride thereby obtaining Δ⁴-androstenol-17 acetate.

RUSSELL EARL MARKER.
EUGENE LEROY WITTLE.

REFERENCES CITED

The following references are of record in the file of this patent:

UNITED STATES PATENTS

| Number | Name | Date |
|---|---|---|
| 2,239,742 | Serini | Apr. 29, 1941 |